Feb. 8, 1927.　　　A. H. SKAER ET AL　　　1,617,225
DRILL SHARPENER
Filed Aug. 11, 1923　　6 Sheets-Sheet 1

Inventors
Arthur H. Skaer and Owen E. Clark
By
Attorney

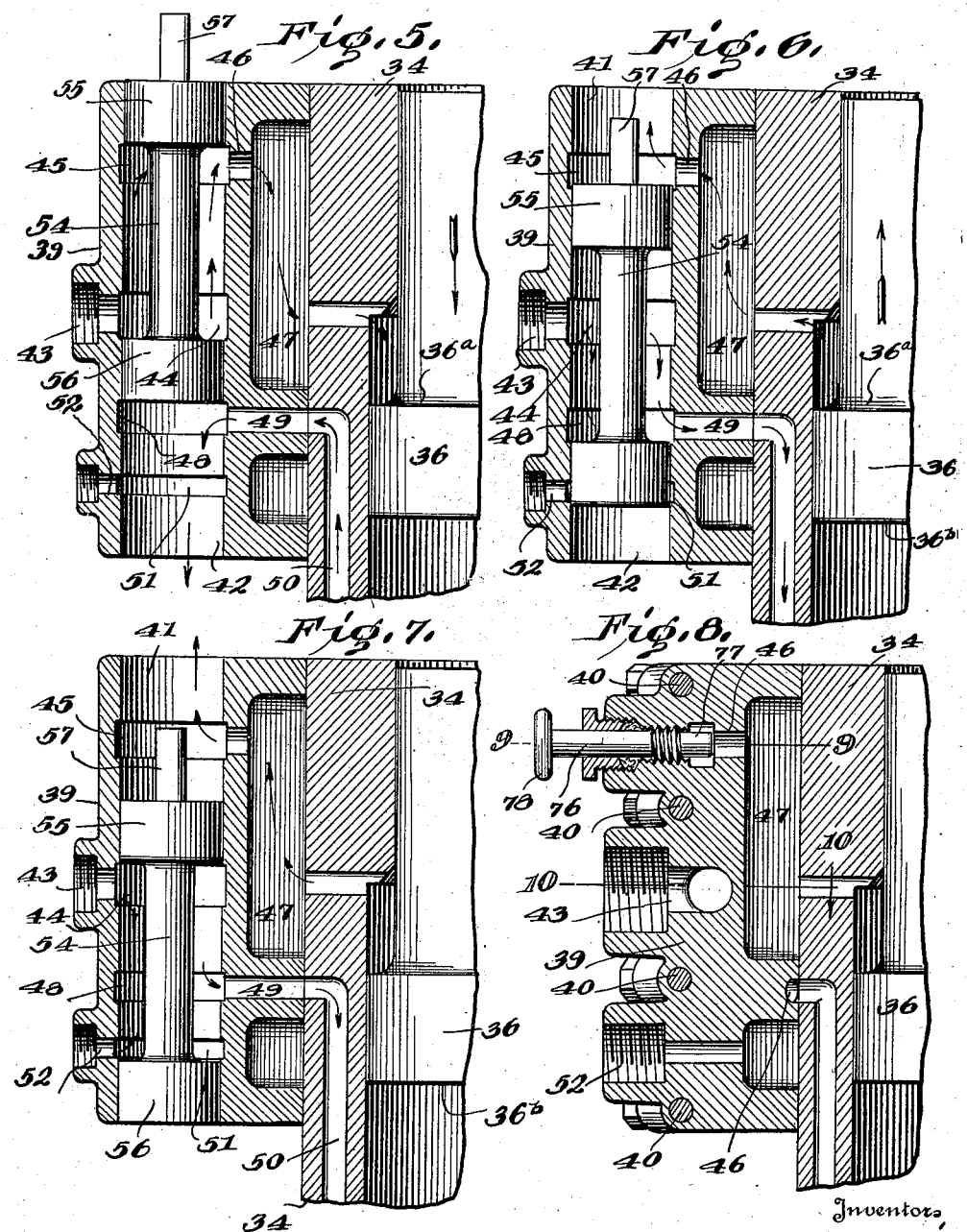

Feb. 8, 1927.
A. H. SKAER ET AL
1,617,225
DRILL SHARPENER
Filed Aug. 11, 1923
6 Sheets-Sheet 6
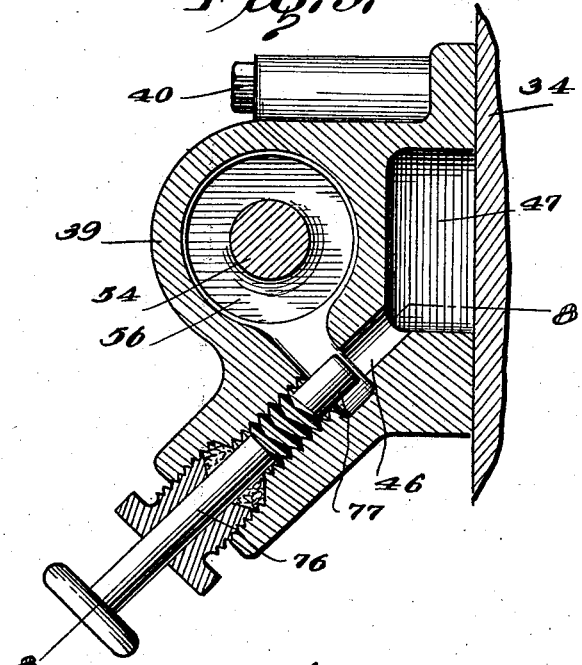
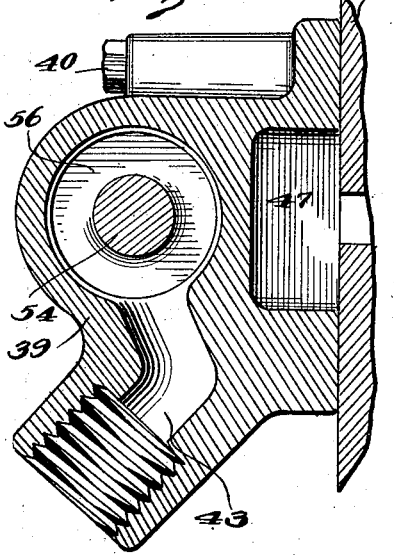
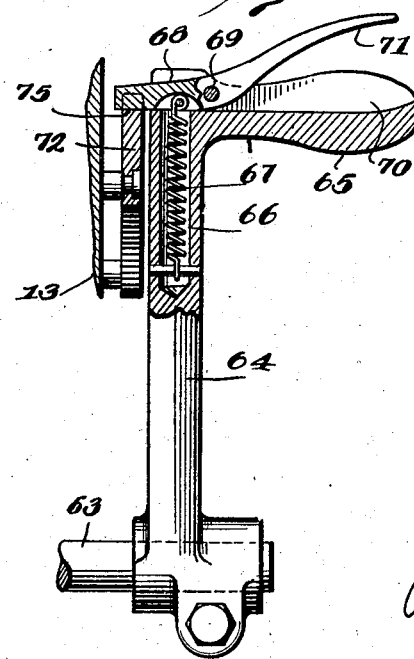
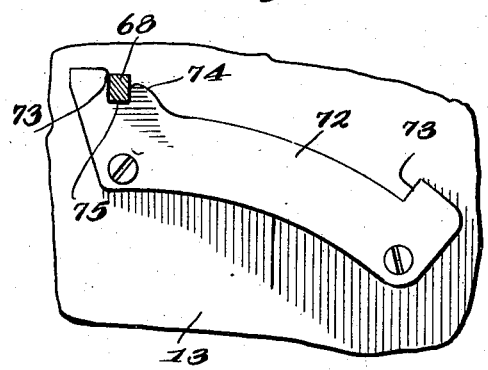

Patented Feb. 8, 1927.

1,617,225

UNITED STATES PATENT OFFICE.

ARTHUR H. SKAER AND OMAR E. CLARK, OF DENVER, COLORADO, ASSIGNORS TO THE DENVER ROCK DRILL MANUFACTURING COMPANY, OF DENVER, COLORADO, A CORPORATION OF DELAWARE.

DRILL SHARPENER.

Application filed August 11, 1923. Serial No. 656,985.

The present invention relates to rock drill sharpeners of the type in which clamping dies are employed for holding a drill steel, and associated therewith is a fluid operated dollying hammer, the object being to provide a compact and effective mechanism in which the operation of the different members is controlled in proper sequence by novel valve mechanism.

Figures 5, 6 and 7 are vertical sectional views somewhat diagrammatic in their character, and illustrating the different positions of the controlling piston valve, Figure 8 is a vertical sectional view through the valve casing illustrating its mounting on the cylinder, Figures 9 and 10 are horizontal sectional views on the lines 9—9 and 10—10 of Figure 8, Figure 11 is a detail sectional view of the valve operating handle crank and lock, Figure 12 is a detail view of the quadrant rack or stop means for said handle crank.

Figure 4:
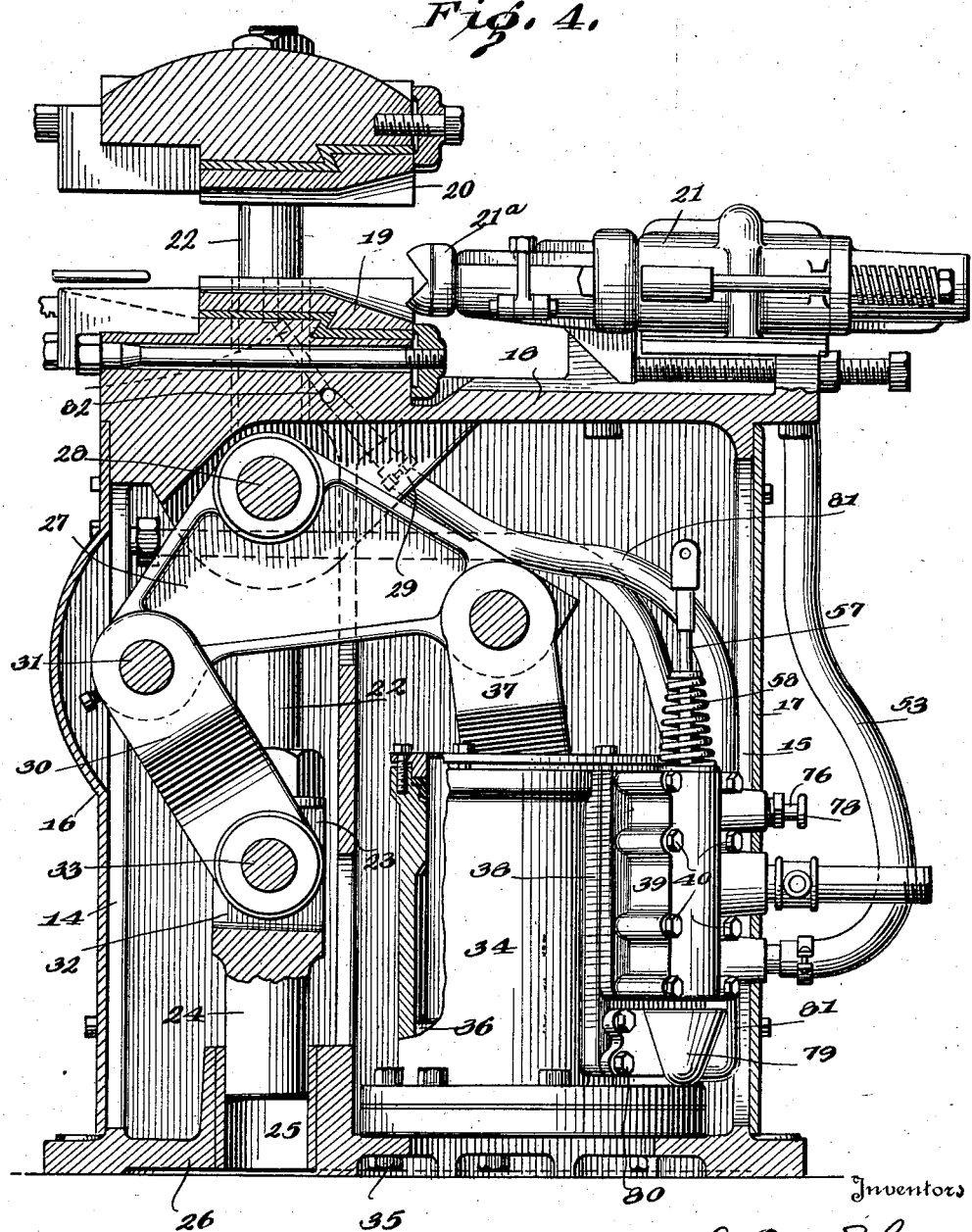
Figure 4 is a vertical longitudinal sectional view.

In the embodiment illustrated an outer casing 13 is employed, having front and rear openings 14 and 15 that may be closed by suitable detachable plates or walls 16 and 17 shown in Figure 4. The top of the casing constitutes a platform or table 18, on which are located coacting work holding dies 19 and 20 and a fluid operated dollying hammer 21.

The die 19 is fixed on the table top and the die 20 moves down and up toward and from the same. It is carried by vertically reciprocating rods 22 spaced apart and connected at their lower ends within the casing by a cross head 23. This cross head has a central depending stem 24 slidably mounted in a vertical bearing 25 formed in the base 26 of the casing. A lever 27, fulcrumed between its ends, as illustrated at 28, to and between depending ears 29, has one end connected to the cross head by a link 30, this link having a pivotal connection 31 with one end of the lever 27 and having its other end fitted in a recess 32 in the cross head and connected to said cross head by a pivot 33.

A vertical cylinder 34 is mounted in the rear portion of the casing, being suitably bolted to the base as illustrated at 35, and having a reciprocatory piston 36 therein. This piston has a pitman connection 37 with the rear end of the lever 27. It will be evident that when the piston 36 is elevated it will cause a downward movement of the rods 22 and a corresponding movement of the die 20 toward the die 19. On the other hand when the piston 36 descends the die 20 will be elevated.

The cylinder 34 has a flattened portion 38 forming a base, to which is bolted a vertical tubular valve casing 39, fastening bolts being illustrated at 40. The valve casing is open ended, and said open ends designated 41 and 42 respectively constitute exhaust ports. A central supply port, as shown at 43, opens into the central portion of the valve chamber and communicates with an internal annular groove 44. A second internal annular groove 45 above the groove 44, is in communication with an outlet port 46 leading by a passageway 47, through the wall of the cylinder 34 to a point above the piston 36, said piston having a relatively small annular pressure surface $36^a$. Another internal annular groove 48, located below the groove 44, has an outlet port 49 leading therefrom, and communicating by means of a passageway 50 with the interior of the cylinder 34 at its lower end below the piston 36. The lower surface of said piston $36^b$ constitutes a pressure surface that comprises the entire area of the piston. A fourth internal annular groove 51 is formed in the valve casing below the groove 48, and an outlet port 52, opening therefrom, is connected by a hose 53 to the fluid operated hammer 21. It will, of course, be understood that this hammer may be of any well known or desired type for delivering repeated blows against a dolly $21^a$ when motive fluid is admitted to it.

Figure 1:
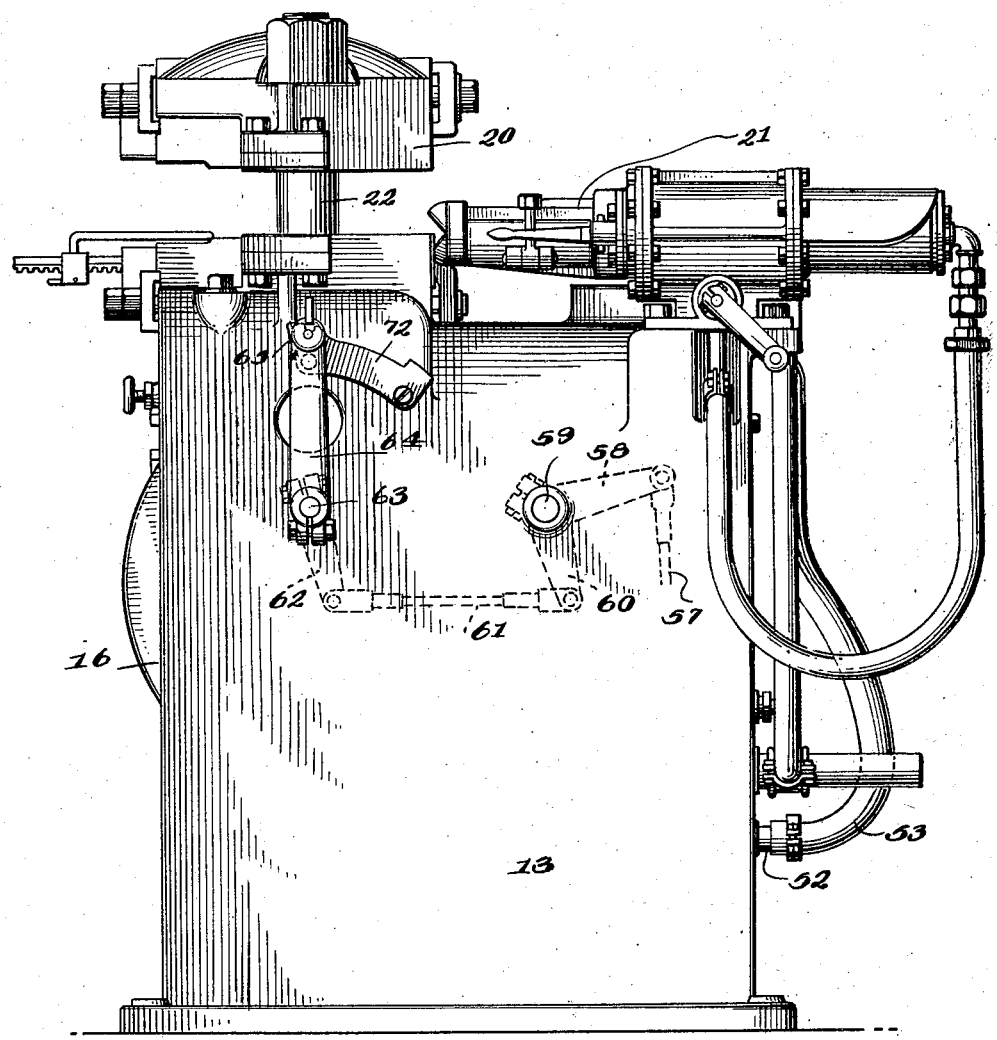
Figure 1 is a side elevation of a sharpener equipped with the novel mechanism.
Figure 2:
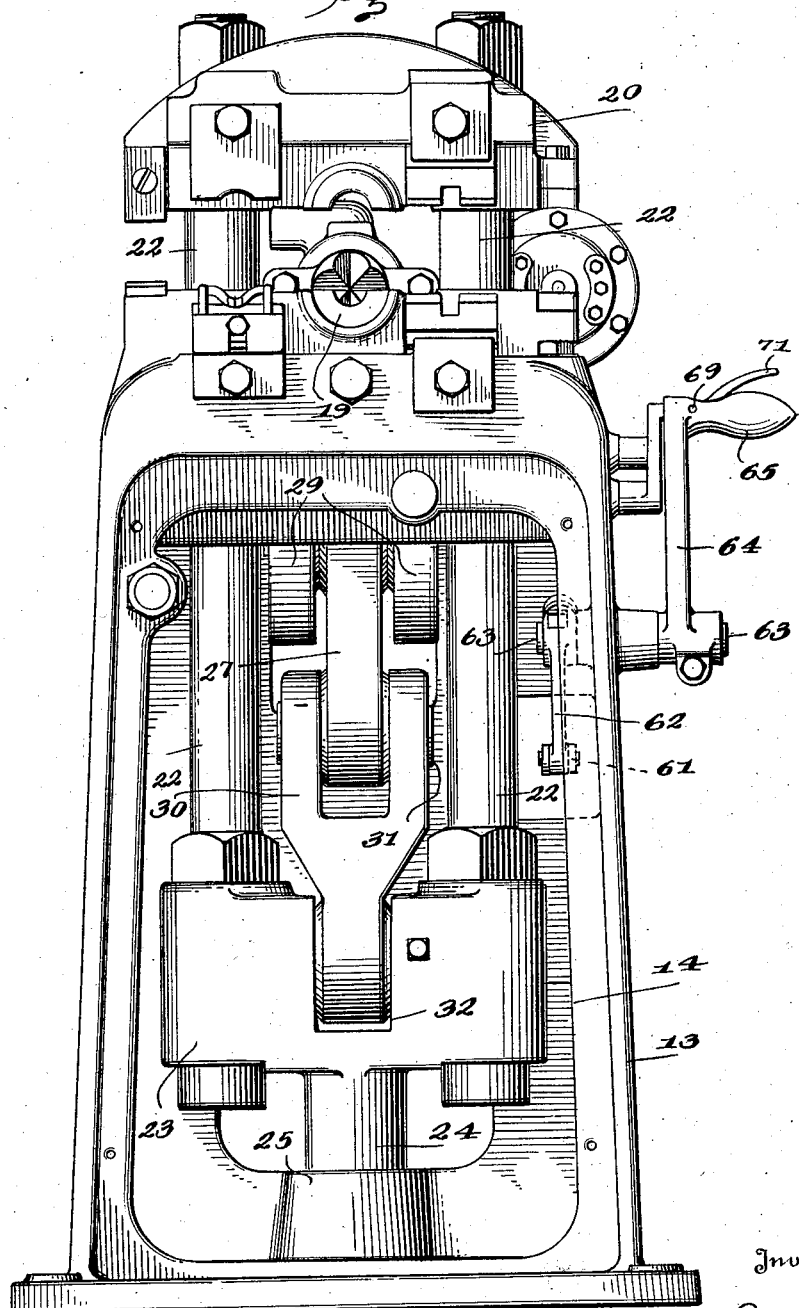
Figure 2 is a front elevation of the same with the front facing plate removed.
Figure 3:
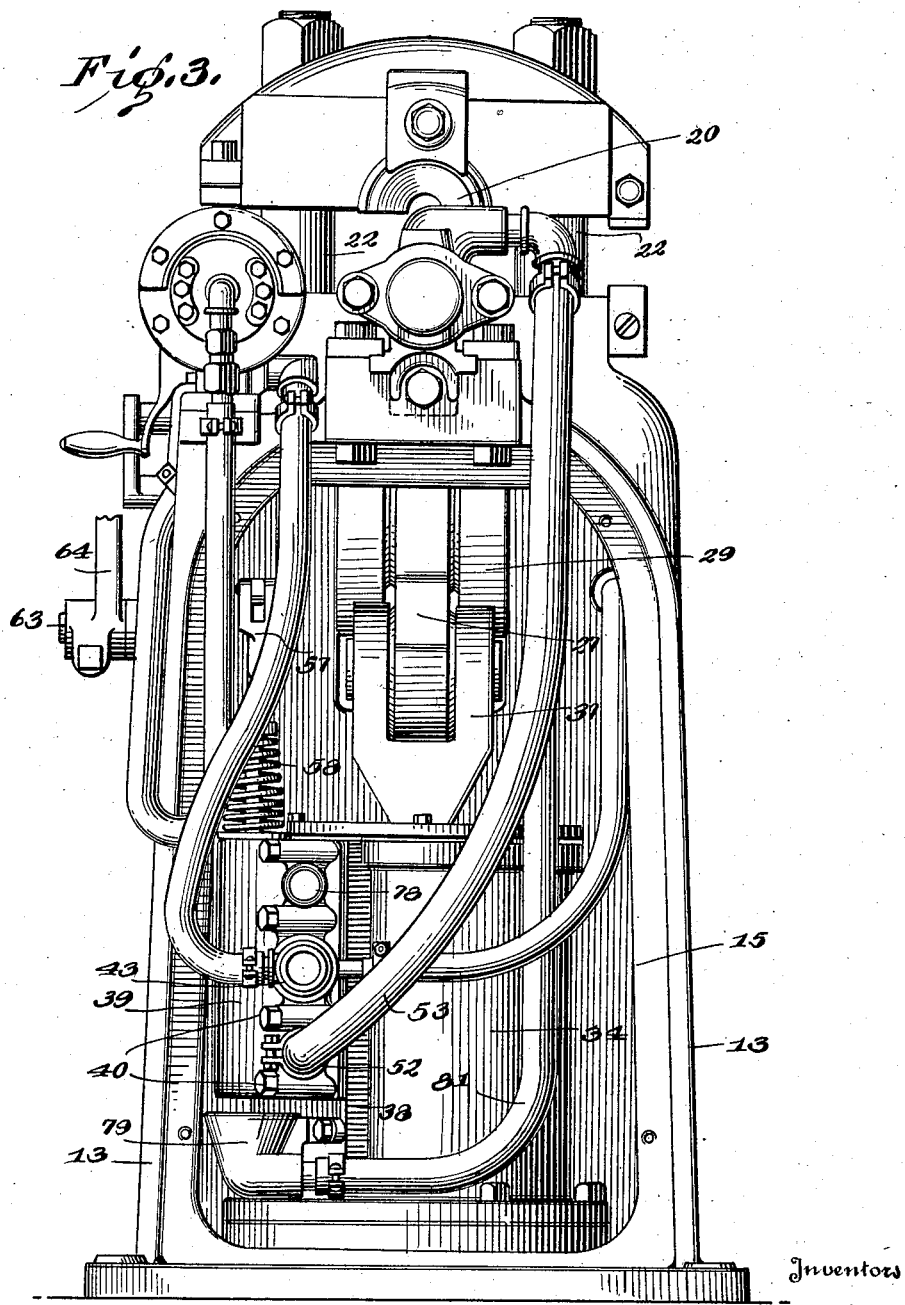
Figure 3 is a corresponding rear elevation.

Operating in the valve casing 39 is a reciprocatory piston valve, comprising a central reduced body 54, having an upper head 55 and a lower head 56, the heads slidably fitting the interior of said casing. The valve is supported by a vertical stem 57 that projects upwardly within the casing and is preferably surrounded by a coiled spring 58 operating to normally hold the valve in its uppermost position, or as illustrated in Figure 5. The stem is suitably connected to one arm 58 of a bell crank journaled within the casing, as shown at 59, and the other arm 60 of said bell crank has a link connection 61 with a crank arm 62 on a rock shaft 63 journaled in one side of the casing, and projecting therefrom. The projecting end carries an upstanding handle crank 64 provided with an outstanding hand grip 65. As shown particularly in Figure 11, the upper end of the crank 64 is bored out to form a socket 66, in which is located a coiled spring 67, and this coiled spring has its upper end connected to the inner arm of a locking lever 68, fulcrumed as shown at 69 in a longitudinal slot 70 formed in the upper side of the hand grip 65. The outer arm 71 of said lever is normally located above the hand grip, and the inner arm is adapted to operate over a quadrant plate 72 fixed to the adjacent side wall of the casing. This quadrant plate is provided at its ends with stop shoulders 73, and is furthermore provided near one end with an upstanding lug 74 of less height than the shoulder, forming a socket 75 to receive the inner arm of the lever 71. With this construction, it will be evident that the operator grasping the lever 65 naturally grasps the outer arm 71 of the locking lever 68, and by compressing his hand, unlocks the crank 64 when it is in the position shown in Figures 1 and 11. The arm can then be swung to the opposite end of the quadrant plate until stopped by the shoulder 73, said shoulder 73 being high enough to always be in the path of the movement of the locking lever. When the crank is thus moved in one direction or the other, obviously the piston valve 54—55—56 is reciprocated.

When the aforesaid piston valve is in its uppermost position, as illustrated in Figure 5, and assuming that air or other fluid under pressure is being delivered through the port 43 to the interior of the valve casing 39, the motive fluid supply port 43 and the outlet port 46 are in communication, so that motive fluid will enter the cylinder 34 above the piston 36 and operating on the surface 36$^a$ will move the piston downwardly, thereby elevating the die 20 or in other words, opening said dies for the reception of the steel. The air below the piston 36 can freely exhaust through the port 49 and the lower open end or exhaust port 42 of the valve casing, all of which are indicated by the arrows in Figure 5. When the steel to be sharpened has been placed between the dies 19 and 20, the operator unlocks the handle crank 64 as above described, and swings said handle crank to the right, thereby moving the piston valve downwardly. The first action is to cause the head 55 of said piston valve to pass across the groove 45, thereby cutting off the port 46 from the fluid supply port 43. A continued movement causes the lower head 56 to pass below the groove 48, thereby bringing the supply port 43 and the outlet port 49 into communication, cutting off said port 49 from the lower exhaust port 42. Fluid under pressure will now flow from the supply port 43 through the outlet port 49 and chamber 50 into the lower end of the cylinder 34 and acting against the relatively large area 36$^b$ of the piston 36, will raise said piston with very considerable force. At the same time the upper head 55 will have passed below the port 46, permitting the fluid above the piston surface 36$^a$ to exhaust through the port 41. This is all indicated in Figure 6.

The upward movement of the piston 36 through the mechanism already described will cause the downward movement of the die 20 toward the die 19, thereby clamping the steel in place. As the piston valve continues its downward movement the lower head 56 will uncover the outlet port 52 and bring it into communication with the supply port 43 while the outlet port 49 continues in such communication. The motive fluid thus finds its way by means of said supply port 43 and hose 53 to the dolly hammer, thus initiating the operation of the latter after the steel has been clamped, and in the well known manner the dolly acting on said steel will shape or sharpen the same. The valve is now in its lowermost position as indicated in Figure 7. To return the parts to their initial position, it is only necessary to return the handle crank, whereupon the piston valve will be raised, first cutting off the supply of motive fluid to the dolly hammer, then likewise closing the lower end of the cylinder to the motive fluid supply, and at the same time opening the lower exhaust port 42 to said supply, after which the exhaust from the upper end of the cylinder is closed and motive fluid is supplied against the upper surface 36$^a$ of the piston.

Inasmuch as these machines are employed under various air pressures, difficulty has been experienced in controlling the speed of the return or opening movement of the dies, as said opening movement is obviously under no material resistance except the weight and inertia of the parts. Too rapid movement is therefore apt to result in strain and even damage. In order to control this according to the pressure of the fluid used, the outlet port 46, leading from the upper end of the valve casing 39, to the upper portion of the cylinder 34, above the piston 36, and as shown in Figures 8 and 9, is controlled by what is in effect a needle valve 76, the inner end 77 of which is adapted to enter more or less into a portion of the port, and obviously control the amount of fluid that will pass through said port in a given period. The outer end of this valve is provided with a handle 78 that is located outside of the casing as illustrated in Figure 4.

In order to remove scale and dirt from the dies, the exhaust from the lower end of the cylinder is utilized and a funnel 79 is employed that is bolted as shown at 80 to the lower end of the platform 38 directly beneath the open lower end or exhaust port 42 of the valve casing 39. This funnel has its delivery end connected to a pipe 81, which conducts the exhaust to passageways and ports 82 opening around the lower die 19.

From the foregoing, it is thought that the construction, operation and many advantages of the herein described invention will be apparent to those skilled in the art without further description and it will be understood that various changes in the size, shape, proportion and minor details of construction, may be resorted to without departing from the spirit or sacrificing any of the advantages of the invention.

Having thus fully described our invention, what we claim as new, and desire, to secure by Letters Patent, is:—

1. In apparatus of the character set forth, the combination with coacting dies, of a cylinder and a fluid operated piston in the cylinder for relatively moving the dies, a fluid operated hammer, a valve casing having a supply port, an outlet port having a single line of connection with the hammer to supply motive fluid thereto for effecting its repeated operation, outlet ports communicating with the cylinder on opposite sides of the piston, and first and second exhaust ports, and a piston valve operating in the casing in one direction to cause the supply port to be brought into communication with one of the outlet ports leading to the cylinder and simultaneously opening the second of said outlet ports to one of the exhaust ports, secondly affording communication between the supply port and the port leading to the hammer to supply fluid thereto and cause its repeated operations while maintaining the first communication in the cylinder and when said valve is moved in an opposite direction first cutting off communication between the supply port and hammer, then cutting off communication between the supply port and said first outlet port leading to the cylinder, and thereafter opening communication between the supply port and the other outlet port to the cylinder and opening the first mentioned outlet port to the second exhaust port.

2. In apparatus of the character described, the combination with a casing, of relatively movable coacting work-clamping dies mounted thereon, a cylinder within the casing, a piston in the cylinder for relatively moving the dies, a valve casing mounted on the cylinder within the casing and having a supply port, and outlet ports opening therefrom and into the cylinder on opposite sides of the piston, a fluid operated hammer on the casing, an outlet port from the valve casing in communication with the hammer, a valve in the casing controlling the ports, and operating means for the valve on the outside of the casing and having communication with said valve inside the casing.

3. In apparatus of the character described, the combination with a casing, of relatively movable coacting work-clamping dies mounted thereon, a cylinder within the casing, a piston in the cylinder for relatively moving the dies, an open ended valve casing mounted on the cylinder within the casing and having a supply port and outlet ports opening therefrom and into the cylinder on opposite sides of the piston, a fluid operated hammer on the casing, an outlet port from the valve casing in communication with the hammer, a reciprocatory piston valve in the casing controlling the communication between the supply port and the outlet ports and between the outlet ports and the open ends of the casing, and operating means for the valve on the outside of the casing and having connections with said valve inside the casing.

4. In apparatus of the character set forth, the combination with relatively movable coacting dies, of fluid operated means for relatively moving the same toward and from each other, a valve casing having a supply port and outlet ports leading to the fluid operated means for alternately effecting their relative movement towards and from each other, a valve in the casing controlling communication between the ports, and means other than said valve for varying the amount of fluid permitted to pass through the outlet port through which the motive fluid passes that controls the opening movement of the dies.

5. In apparatus of the character set forth, the combination with relatively movable coacting dies, of fluid operated means for relatively moving the same, a valve casing having a supply port and outlet ports leading to the fluid operated means, a valve in the casing controlling communication between the ports, and an adjustable valve for varying the amount of fluid permitted to pass through the outlet port that controls the opening movement of the dies.

6. In apparatus of the character set forth, the combination with an outer casing, of a fixed die and a coacting movable die mounted on the casing, a cylinder in the casing, a piston in the casing and operating the movable die, valve mechanism in the outer casing for controlling the supply of fluid to the cylinder, valve operating means outside the outer casing, a valve in the outer casing for varying the amount of fluid that controls the opening movement of the movable die, and an operating device for the latter valve located outside the outer casing.

7. In apparatus of the character set forth, the combination with a base or support, of a stationary and a coacting movable die mounted on the base or support, vertically movable carrier rods supporting the movable die, a cross head connecting the carrier rods and having a stem, a guideway for the stem, and a motor for the movable die located at one side of the rods and cross head and having means engaged with the cross head for moving the rods and the die supported thereby.

8. In apparatus of the character set forth, the combination with a base or support, of a stationary and a coacting movable die mounted on the base or support, vertically movable carrier rods supporting the movable die, a cross head connecting the carrier rods and having a depending stem located in a plane between the rods, a guideway on the base or support for the stem, and a motor located in the base or support at one side of the rods and cross head and having means engaged with the cross head for moving the rods and the die supported thereby.

In testimony whereof, we affix our signatures.

ARTHUR H. SKAER.
OMAR E. CLARK.